US007991879B2

(12) United States Patent
Josefsberg et al.

(10) Patent No.: US 7,991,879 B2
(45) Date of Patent: Aug. 2, 2011

(54) INTERNET LOCATION COORDINATE ENHANCED DOMAIN NAME SYSTEM

(75) Inventors: Arne Josefsberg, Medina, WA (US); John D Dunagan, Bellevue, WA (US); Mark D. Scheibel, Kirkland, WA (US); Alastair Wolman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 12/041,583

(22) Filed: Mar. 3, 2008

(65) Prior Publication Data

US 2009/0222581 A1 Sep. 3, 2009

(51) Int. Cl.
G06F 15/173 (2006.01)
(52) U.S. Cl. ...................................................... 709/224
(58) Field of Classification Search .................. 709/223, 709/224, 227
See application file for complete search history.

(56) References Cited

U.S. PATENT DOCUMENTS

| | | | |
|---|---|---|---|
| 6,128,279 A | 10/2000 | O'Neil et al. | |
| 6,351,775 B1 | 2/2002 | Yu | |
| 6,446,121 B1* | 9/2002 | Shah et al. | 709/224 |
| 6,606,643 B1 | 8/2003 | Emens et al. | |
| 6,625,319 B1* | 9/2003 | Krishnamachari | 382/238 |
| 6,785,704 B1 | 8/2004 | McCanne | |
| 6,981,055 B1 | 12/2005 | Ahuja et al. | |
| 7,003,555 B1 | 2/2006 | Jungck | |
| 7,062,562 B1* | 6/2006 | Baker et al. | 709/227 |
| 7,111,061 B2 | 9/2006 | Leighton et al. | |
| 7,136,932 B1 | 11/2006 | Schneider | |
| 7,152,118 B2 | 12/2006 | Anderson, IV et al. | |
| 7,171,415 B2 | 1/2007 | Kan et al. | |
| 7,194,552 B1 | 3/2007 | Schneider | |
| 7,228,359 B1 | 6/2007 | Monteiro | |
| 7,284,051 B1 | 10/2007 | Okano et al. | |
| 7,519,690 B1 | 4/2009 | Barrow et al. | |
| 7,574,508 B1 | 8/2009 | Kommula | |
| 7,584,301 B1 | 9/2009 | Joshi | |
| 7,685,422 B2* | 3/2010 | Isozaki et al. | 713/171 |
| 7,707,314 B2 | 4/2010 | McCarthy et al. | |
| 7,710,984 B2 | 5/2010 | Dunk | |
| 2002/0038360 A1* | 3/2002 | Andrews et al. | 709/223 |
| 2003/0069968 A1 | 4/2003 | O'Neil et al. | |
| 2003/0229697 A1 | 12/2003 | Borella | |
| 2004/0039798 A1 | 2/2004 | Hotz et al. | |
| 2004/0073640 A1 | 4/2004 | Martin et al. | |
| 2004/0264465 A1 | 12/2004 | Dunk | |
| 2005/0265317 A1 | 12/2005 | Reeves et al. | |

(Continued)

OTHER PUBLICATIONS

"Flow Control Platform (FCP) Solutions", at <<http://k2colocation.com/network-services/fcp.cfm>>, K2 Colocation, 2005, pp. 2.

(Continued)

Primary Examiner — Joseph E. Avellino
Assistant Examiner — Jeong S Park
(74) Attorney, Agent, or Firm — Lee & Hayes, PLLC (57) ABSTRACT

An exemplary architecture is for an Internet Location Coordinate enhanced Domain Name System (DNS). An exemplary method includes requesting information for a plurality of servers associated with a network domain name of a Domain Name System (DNS) where the information includes information based in part on packets transmitted by each of the plurality of servers to a plurality of network beacons; receiving the requested information from a name server associated with the Domain Name System (DNS); and, based in part on the received information, selecting an optimal server for the network domain name. Other methods, devices and systems are also disclosed.

18 Claims, 11 Drawing Sheets

U.S. PATENT DOCUMENTS

| | | |
|---|---|---|
| 2006/0075139 A1 | 4/2006 | Jungck |
| 2006/0129675 A1 | 6/2006 | Zimmer et al. |
| 2006/0143442 A1 | 6/2006 | Smith |
| 2006/0190602 A1 | 8/2006 | Canali et al. |
| 2006/0200539 A1 | 9/2006 | Kappler et al. |
| 2006/0224773 A1 | 10/2006 | Degenaro et al. |
| 2007/0016663 A1 | 1/2007 | Weis |
| 2007/0041393 A1 | 2/2007 | Westhead et al. |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2008/0016233 A1 | 1/2008 | Schneider |
| 2008/0086574 A1 | 4/2008 | Raciborski et al. |
| 2008/0235383 A1 | 9/2008 | Schneider |
| 2009/0019181 A1 | 1/2009 | Fang et al. |
| 2010/0010991 A1 | 1/2010 | Joshi |

OTHER PUBLICATIONS

"Global Server Load Balancing for Disaster Recovery, Business Continuity, Performance Optimization and Datacenter Management", at <<http://www.zeus.com/documents/en/ZXT/ZXTM_Global_Load_Balancer.pdf>>, Zeus Technology Limited, 1995-2007, pp. 4.

Linden, "The End of Federated Search?", at <<http://glinden.blogspot.com/2007/03/end-of-federated-search.html>>, Mar. 24, 2007, pp. 9.

Domain Name System (DNS), retrieved on Apr. 29, 2008 at <<http://www.unix.org.ua/orelly/networking/firewall/ch08_10.htm>>, Unix, pp. 1-11.

Domain Name System (DNS) A Guide to TCP/IP, retrieved at <<http://web.syr,edu/~djmolta/ist452/ch_07.ppt>>, Thomson Learning Course Technology, pp. 1-56.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

Wikipedia, "Operating System", retrived from <<http://en.wikipedia.org/wiki/Operating_system>> on Oct. 8, 2010, pp. 1-17.

* cited by examiner

EXEMPLARY DNS SYSTEM 800

FIG. 8

902 — EXEMPLARY ILC ENHANCED DNS TECHNIQUES 900

| STEP | CLIENT | LOCAL NAME SERVER | REMOTE NAME SERVER |
|---|---|---|---|
| 1 | SEND REQUEST FOR W.W.COM | | |
| 2 | | SEND REQUEST FOR W.W.COM | |
| 3 | | | RESPONSE TO REQUEST FOR W.W.COM |
| 4 | | SEND RESPONSE FOR W.W.COM | |
| 5 | RECEIVE RESPONSE | | |

EXEMPLARY CLIENT DEPENDENT METHOD 910
WHEN CLIENT QUERIES FOR W.W.COM:
    (A) IT QUERIES FOR THE A RECORD (W.W.COM TYPE A); AND
    (B) FOR ANY ASSOCIATED ILC TEXT RECORDS (ILC.W.W.COM TYPE TXT)

EXEMPLARY SERVER DEPENDENT METHOD 920
WHEN CLIENT QUERIES FOR W.W.COM:
    (A) IT QUERIES FOR THE A RECORD (W.W.COM TYPE A);
    (B) REMOTE NAME SERVER RESPONDS WITH THE A RECORD(S); AND
    (B) ANY ASSOCIATED ILC TEXT RECORDS (ILC.W.W.COM TYPE TXT).

EXEMPLARY SERVER DEPENDENT METHOD 930
WHEN CLIENT QUERIES FOR W.W.COM:
    (A) IT QUERIES FOR THE A RECORD (W.W.COM TYPE A);
    (B) REMOTE NAME SERVER RESPONDS WITH THE A RECORD(S); AND
    (B) ANY ASSOCIATED W.W.COM RECORDS OF TYPE ILC.

EXEMPLARY SERVER DEPENDENT METHOD 940
WHEN CLIENT QUERIES FOR W.W.COM:
    (A) IT QUERIES FOR THE A RECORD (W.W.COM TYPE A);
    (B) REMOTE NAME SERVER RESPONDS WITH THE A RECORD(S); AND
    (B) ANY ASSOCIATED ILC RESOURCE RECORD (RR) TYPE.

FIG. 9

EXEMPLARY METHOD 1000

ACQUIRE ILC INFORMATION 1010

| ILC 120 | | ILC 130_1 | | ILC 130_2 | | ILC 130_3 | |
|---|---|---|---|---|---|---|---|
| BEACON | RTT | BEACON | RTT | BEACON | RTT | BEACON | RTT |
| 115_2 | 25 MS | 115_2 | 4 MS | 115_2 | 30 MS | 115_2 | 18 MS |
| 115_3 | 8 MS | 115_3 | 12 MS | 115_3 | 10 MS | 115_3 | 19 MS |
| 115_4 | 14 MS | 115_4 | 16 MS | 115_4 | 12 MS | 115_4 | 10 MS |

DETERMINE OPTIMAL SERVER 1020

INTERNET LOCATION COORDINATE ENHANCED DOMAIN NAME SYSTEM

BACKGROUND

The Domain Name System (DNS) and its associated protocols emerged in the early 1980s to "organize" the growing number of resources connected to and making up the ARPA Internet. As stated in an early and now obsolete "Requests for Comments" (RFC) 882 of the Internet Society, "the basic need is for a consistent name space which will be used for referring to resources" (for more recent RFCs, see, e.g., 1034 or 1035). The DNS of the early '80s targeted inadequacies of the Network Information Center (NIC) table-based mechanism for mapping between host names and Internet addresses and the lack of harmonization among burgeoning electronic mail systems. As stated in RFC 882, through the DNS "[w]e should be able to use names to retrieve host addresses, mailbox data, and other as yet undetermined information".

Some 25 years later, the DNS as currently implemented, is somewhat underutilized. In part, underutilization is linked to the DNS's simplicity. In the DNS names refer to a set of resources and queries contain resource identifiers. As stated in RFC 882 "[t]he only standard types of information that we expect to see throughout the name space is structuring information for the name space itself, and resources that are described using domain names and no nonstandard data". Thus, DNS as currently implemented requires no additional data; resources are typically described using only domain names and a structured name space.

The DNS alone fails to provide a remedy to severe congestion issues stemming from rising Internet traffic (e.g., due to web innovations, globalization and increasing connectivity to billions of people in emerging markets). In other words, in the DNS, as currently implemented, there is no mechanism to describe how resources exist in a network environment or to describe local conditions in a network environment. As described herein, various exemplary systems, methods, etc., can describe network conditions and make the Internet more efficient.

SUMMARY

An exemplary architecture is for an Internet Location Coordinate (ILC) enhanced Domain Name System (DNS). An exemplary method includes requesting information for a plurality of servers associated with a network domain name of a Domain Name System (DNS) where the information includes information based in part on packets transmitted by each of the plurality of servers to a plurality of network beacons; receiving the requested information from a name server associated with the Domain Name System (DNS); and, based in part on the received information, selecting an optimal server for the network domain name. Other methods, devices and systems are also disclosed.

DESCRIPTION OF DRAWINGS

Non-limiting and non-exhaustive examples are described with reference to the following figures.

DETAILED DESCRIPTION

Various exemplary methods, devices and system described herein pertain to networks and more specifically to techniques to enhance the Domain Name System (DNS). An exemplary system includes beacons in a network that provide information to participants about their respective "locations" in a network space. As described herein, a participant can be any resource on a network (e.g., a client, a server, etc.). Such a system can aid in routing network traffic and hence improve network efficiency. In various examples, the network is the Internet. In various examples, transmission of location information can occur via DNS and TXT records; via "Extensions to DNS" (EDNS) and explicit new record types; or entirely outside DNS but applied to select an address returned by a DNS query.

Figure 1:
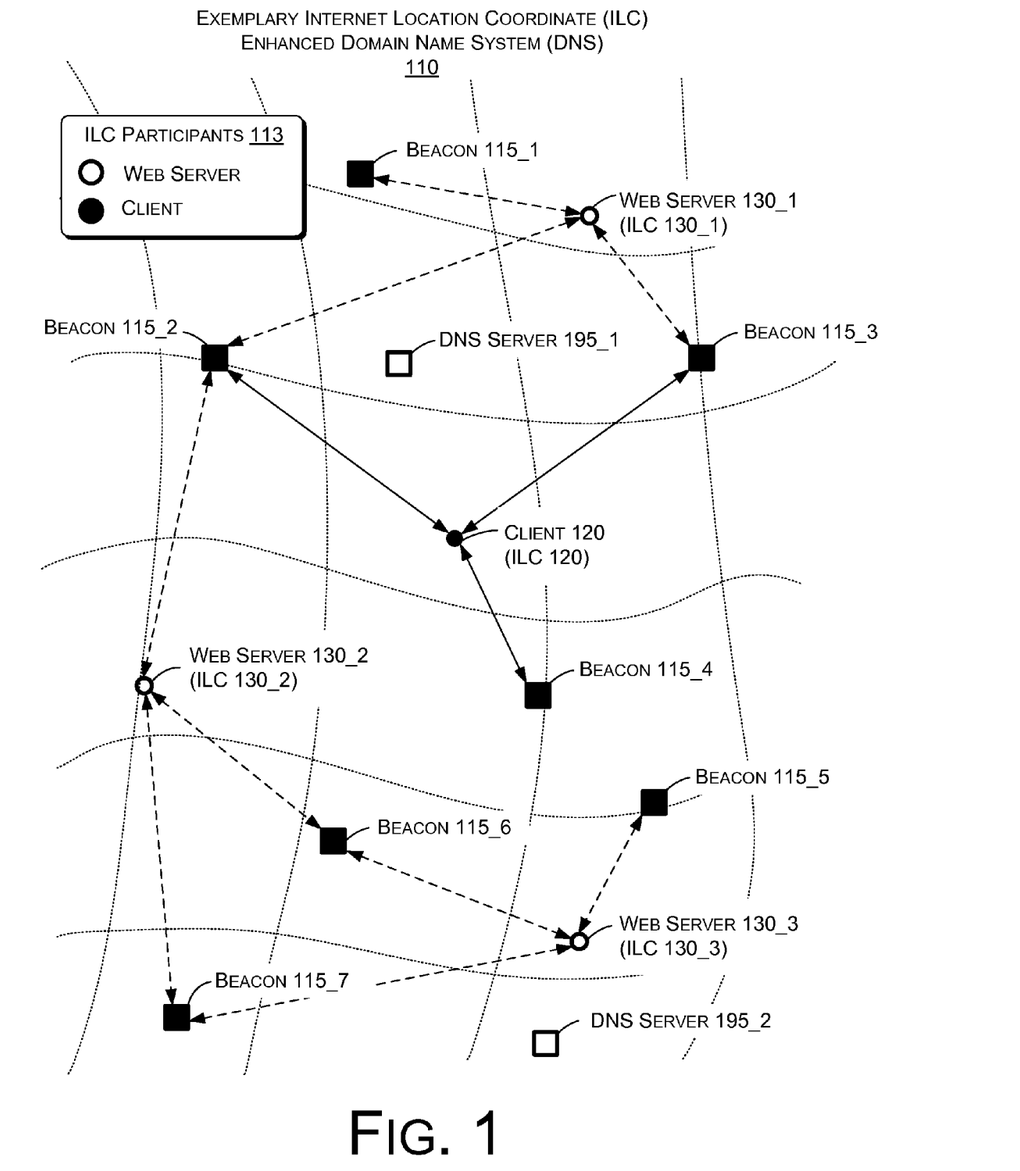
FIG. 1 is a diagram of an exemplary network logical space that includes beacons.

FIG. 1 shows an exemplary Internet Location Coordinate (ILC) enhanced Domain Name System (DNS) 110. The system 110 includes beacons 115, a client 120, web servers 130 and DNS servers 195. Any resource on the Internet that can acquire an ILC may be deemed an ILC participant. For example, a box in FIG. 1 shows ILC participants 113 as including the client 120 and the web servers 130; thus, in this example, an ILC participant can be a client or a server.

The system 110 may depend on time, distance, network traffic, machine workload, bandwidth, etc. To understand better how such a system may be defined, consider a vehicle on a major interstate highway en route to an airport. At various locations along the highway, the state department of transportation transmits information to displays that provide information to vehicle operators. When the vehicle is at a display location, the department of transportation may transmit a travel time message that indicates how many minutes it will take for a vehicle at the display location to reach the airport. Such information is helpful as the vehicle operator may decide to take an alternate route. Further, the reasons for the stated travel time may be irrelevant to the vehicle operator. In other words, the vehicle operator may not care whether the travel time is lengthy due to road construction, holiday traffic, an accident, etc. While the department of transportation may choose to display a specific reason or reasons, such information may not add much value to the information conveyed by a simple travel time in minutes.

As described herein, in various examples, an Internet Location Coordinate (ILC) may be a number, a set of numbers, or a set of numbers where each one is associated with some additional information (e.g., a tuple for each beacon). An ILC may indicate a local position to a client where this position is with respect to a network logical space measuring "travel time" or congestion, and not necessarily geographic location. ILCs may be compared to estimate "travel time" or congestion between participants. Such simplicity is in-line with the DNS and such an ILC may be carried according to an existing DNS protocol.

Referring again to the system 110 of FIG. 1, the client 120 acquires information associated with three beacons 115_2, 115_3 and 115_4. For example, a beacon can act as a reflector where the client 120 can send a packet to the beacon and receive a response packet. The client 120 can then determine the round trip time (RTT) to and from a beacon (e.g., a "travel time"). As the client 120 performs the same process with multiple beacons (i.e., the beacons 115_2, 115_3 and 115_4), the client 120 becomes more aware of its surroundings. In particular, the client 120 becomes aware of its own condition in the system where its own condition may be represented according to a number or a set of numbers, etc. In the example of FIG. 1, the "condition" is shown as Internet Location Coordinate (ILC). While the example of FIG. 1 shows three beacons, other numbers of beacons may be used. Generally, two or more beacons may be used.

As mentioned, an ILC participant can be any resource on a network. Hence, the web servers 130_1, 130_2 and 130_3 may be participants that can determine respective ILCs using the beacons 115. For example, the web server 130_1 may transmit packets to the beacons 115_1, 115_2 and 115_3 and receive corresponding return packets. As the web server 130_1 may know, a priori, information about the beacons 115_1, 115_2 and 115_3, it can now determine its position in the system (e.g., its ILC).

As described herein, the exemplary system 110 allows clients to determine their position in a network logical space. Such information can be used for a variety of purposes. For example, where the web servers 130_1, 130_2 and 130_3 provide essentially identical services, such information can be used to allow the client 120 to connect to the "best" web server (e.g., the "closest" server based on ILCs).

Figure 2:
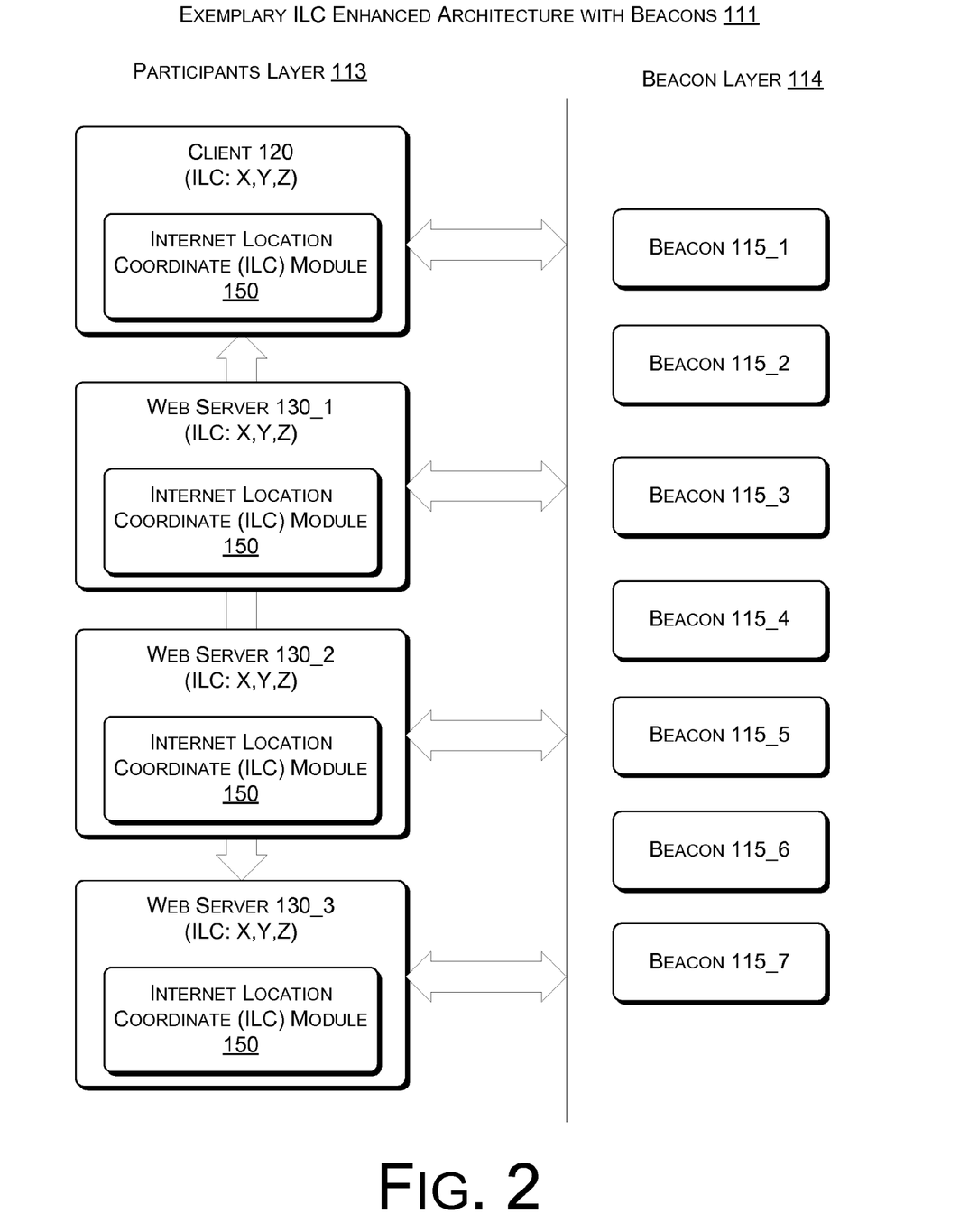
FIG. 2 is a diagram of an exemplary architecture for a network logical space that includes beacons.

FIG. 2 shows an exemplary ILC enhanced architecture with beacons 111. The architecture 111 includes a participants layer 113 and a beacon layer 114. In this example, the beacon layer 114 includes a plurality of beacons 115_1 to 115_7 that are located in a network. The location of the beacons 115_1 to 115_7 may be determined on the basis of any of a variety of factors such as network traffic, network hubs, geography, etc.

The participants layer 113 includes a plurality of networked clients, for example, the client 120 and the web servers 130_1, 130_2 and 130_3 of FIG. 1. Each of the clients in the participants layer 113 includes an Internet Location Coordinate (ILC) module 150, which is typically a software component for interpreting information from packets sent to and received from beacons. Such a module may determine an ILC for a client on a network. Such a module may be implemented as a component of an operating system. Hence, according to the architecture 111, an exemplary locating mechanism requires network beacons and participant instruction modules. Such a mechanism can optionally be implemented without altering the existing DNS. Of course, a surrogate participant may be configured to determine an ILC for another network resource (e.g., a similarly situated resource).

Figure 3:
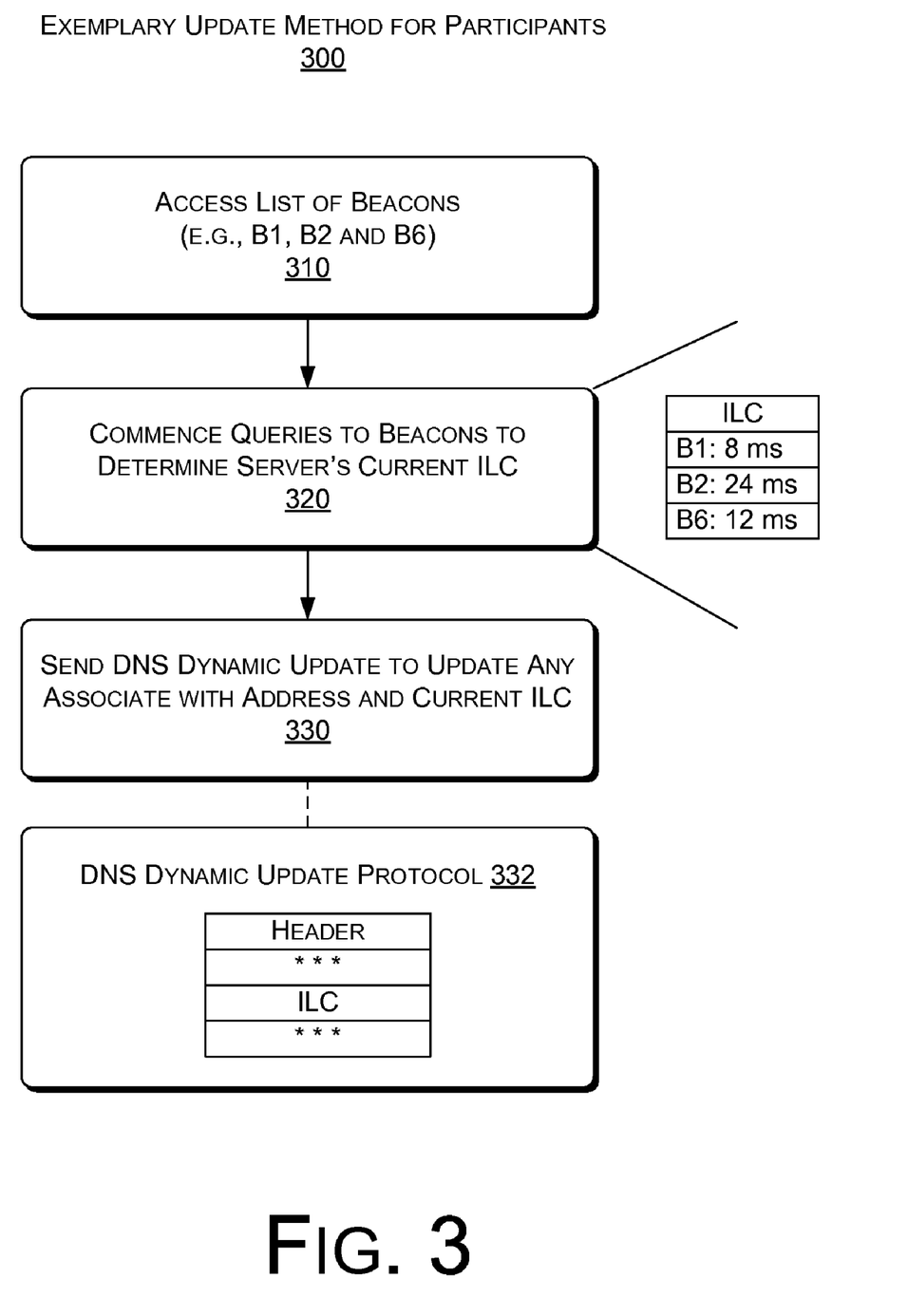
FIG. 3 is a diagram of an exemplary method for servers to update ILC information.

FIG. 3 shows an exemplary update method for participants 300. In an access block 310, a participant accesses a list of beacons. In a query block 320, the participant commences queries to the beacons, for example, in the form of packets that may be reflected off the beacons (e.g., using a DNS request and response packet protocol). Based on these queries, the participant determines its current ILC. An ILC may be a series of beacon names and associated RTTs (e.g., travel times). Thus, an ILC may include a tuple for each beacon. Once determined, in a send block 330, the participant may send a DNS dynamic update to update any relevant other participant with the participant's address and current ILC. As indicated in block 332, a DNS dynamic update protocol requires a header and provides for additional information. As described herein, a participant can update its ILC information using a DNS dynamic update protocol. Clients that are ILC participants will typically not publish their ILC directly, just as they do not currently publish their DNS name. Servers that are ILC participants will typically publish their ILC directly, just as they currently do publish their DNS name.

Figure 4:
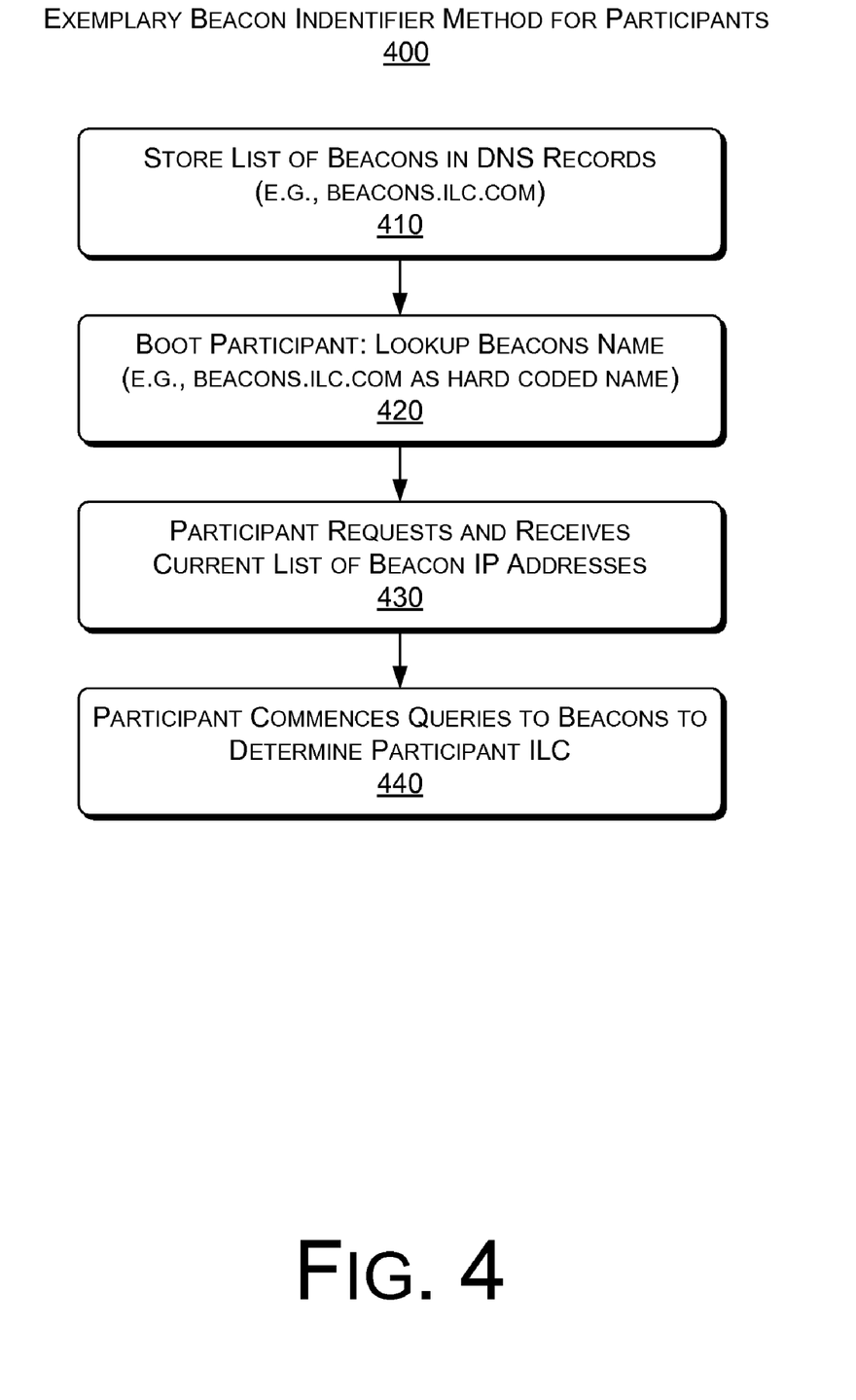
FIG. 4 is a diagram of an exemplary method for clients to determine ILC information.

FIG. 4 shows an exemplary beacon identifier method for participants 400. In a storage block 410, a list of beacons is stored in DNS records, remote from a participant. In the example of FIG. 4, the list of beacons may be stored in a record identified as beacons.ilc.com. In a participant boot block 420, when the participant boots, a lookup occurs for the list of beacons. For example, the participant may have the name beacons.ilc.com hard coded and accessible at boot. Per a request and receipt block 430, the participant uses the name to request and receive a current list of beacon IP addresses. A query block 440 follows where the participant commences queries to the beacons, for example, in the form of packets that may be reflected off the beacons (e.g., using a DNS request and response packet protocol). Based on these queries, the participant determines its current ILC.

Figure 5:
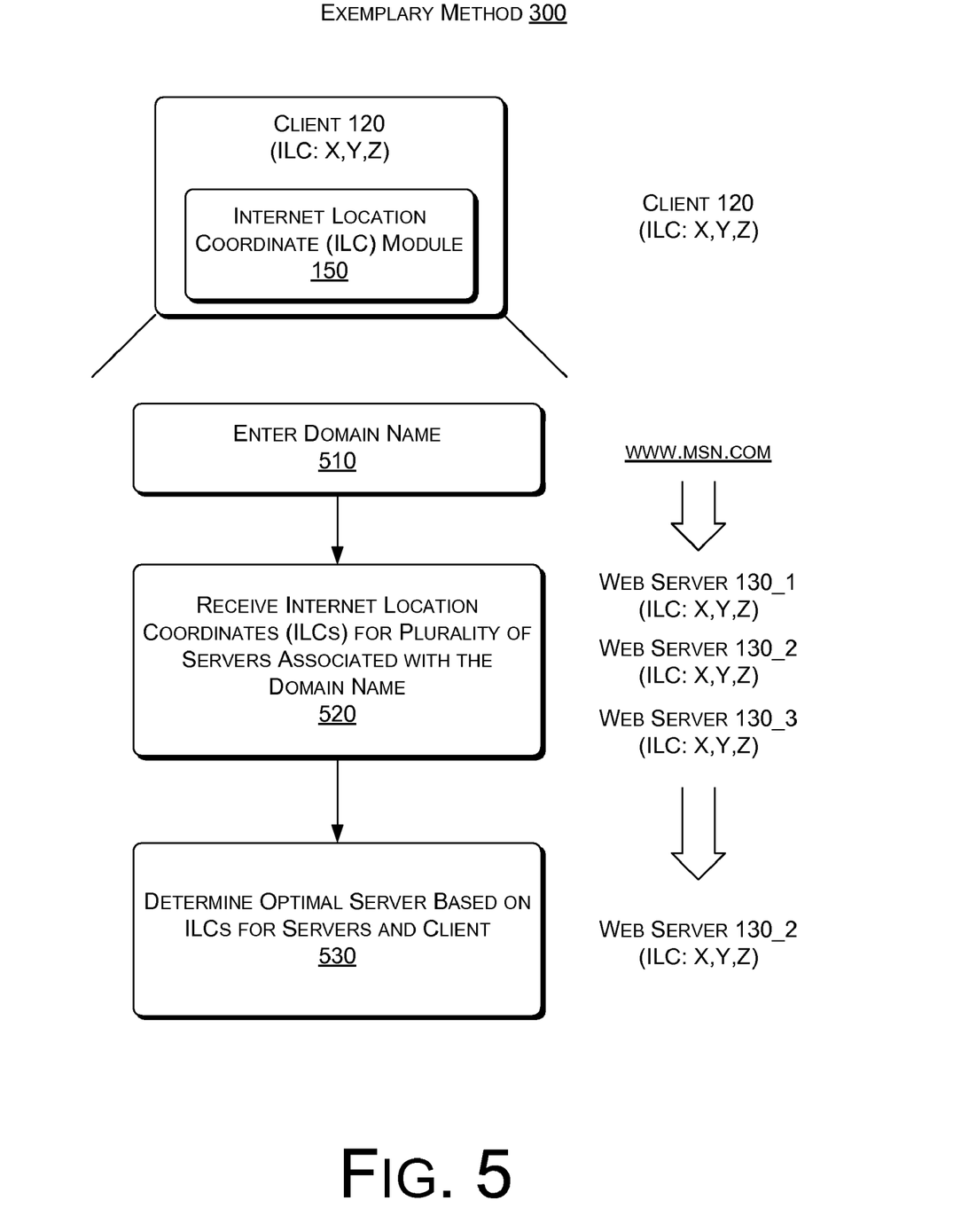
FIG. 5 is a diagram of an exemplary method for determining an optimal server for a group of servers for a domain name.

FIG. 5 shows an exemplary method 500 for determining an optimal server from a plurality of servers. In this example, the plurality of servers are participants in an ILC enhanced system. The method 500 may be implemented using a client 120 located on a network where the client 120 includes an ILC module 150; accordingly, the client 120 "knows" its ILC in the network space.

In an entry block 510, a domain name is entered (e.g., www.msn.com). In turn, a DNS server may identify a plurality of servers associated with the domain name, for example, web server 130_1, 130_2 and 130_3. As explained, each of the servers includes an ILC module to ascertain their respective ILCs. In a receipt block 520, the client 120 receives information about the group of servers along with the ILC for each of the servers in the group. In a determination block 530, the client 120 determines the optimal server based on the ILCs for the servers and its own ILC.

In the example of FIG. 5, the client 120 may be a user connected to the Internet and the domain name may be www.msn.com. This domain name has a plurality of associated servers at various geographical locations around the world. Given the exemplary architecture 111 where beacons 115 are scattered throughout the networked world, each of the www.msn.com domain name servers knows its own ILC. When the DNS communicates with each server, each server can respond by sending its ILC to the DNS server, which, in turn, transmits this information to the client 120. The ILC module 150 can then determine which server is the optimal server based on the client's 120 ILC and those of the servers. In general, the optimal server is the server that can provide the most efficient service to the client 120.

Figure 6:
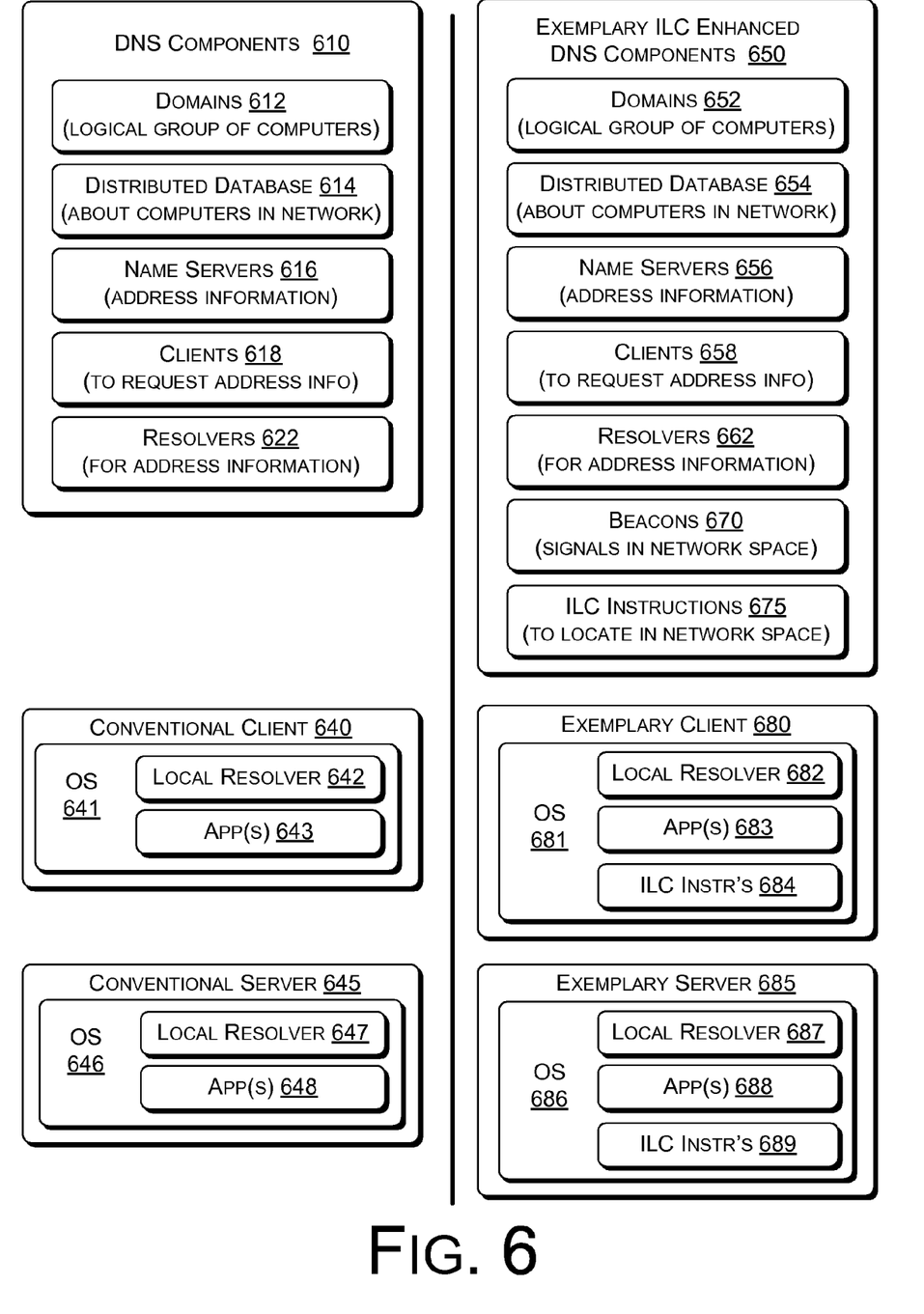
FIG. 6 is a diagram of conventional DNS components and exemplary DNS components.

As mentioned, an exemplary system can enhance DNS, as DNS is currently implemented. FIG. 6 shows DNS components 610, a DNS client 640 and a DNS server 645 along with exemplary ILC enhanced DNS components 650, an exemplary ILC enhanced DNS client 680 and an exemplary ILC enhanced DNS server 685.

The DNS components 610 include domains 612 where a domain is a logical group of computers in a large network and where access to each computer in a given group is controlled by a name server; a distributed database 614 that is an archive of information about the computers in a network; name servers 616 where a name server contains address information about other computers on the network where this information can be given to client computers that make a request to the name server; clients 618 that request information from a server, specifically where a client requests network addressing information from the name servers; and resolvers 622 that provide clients with address information about other computers on the network.

The client 640 includes an operating system 641 with a local resolver 642 and one or more local applications 643. The server 645 includes an operating system 646 with a local resolver 647 and one or more local applications 648.

The exemplary ILC enhanced DNS components 650 include domains 652, a distributed database 654, name servers 656, clients 658 and resolvers 662, which may be as in the DNS components 610, yet further include beacons 670 and ILC instructions 675. An exemplary ILC enhanced client 680 includes an operating system 681, a local resolver 682, one or more local applications 683 and ILC instructions 684. An exemplary ILC enhanced server 685 includes an operating system 486, a local resolver 687, one or more local applications 688 and ILC instructions 689.

Figure 7:
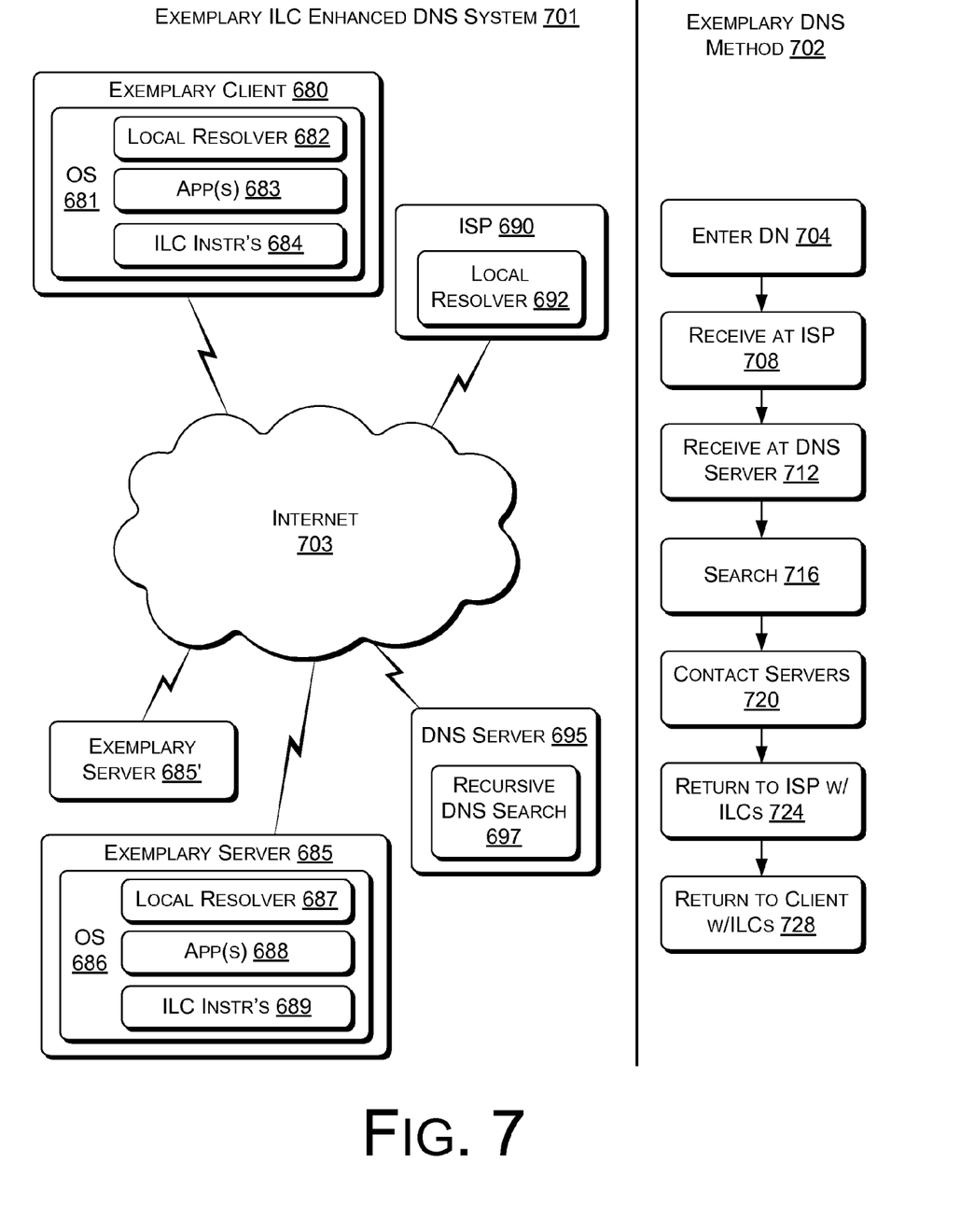
FIG. 7 is a diagram of an exemplary DNS system and an exemplary DNS method.

FIG. 7 shows an exemplary ILC enhanced DNS system 701 and method 702. The system 701 includes the Internet 703 and a client 680, a plurality of servers 685, 685', an Internet Service Provider (ISP) server 690, and a DNS server 695 all in communication with the Internet 703. The method 702 commences in an entry block 704 where a user at the client 680 enters a domain name, for example, in a field of a web browser application. Such a user generally does not communicate directly with the local DNS resolver 682 of the client 680. Instead DNS resolution takes place transparently in the client-application(s) 683 (e.g., web browsers, email, and other Internet applications). When the application 683 makes a request which necessitates a DNS lookup, a resolution request is sent to the local DNS resolver 682 in the local operating system 681, which in turn handles the communications required.

Often, the DNS resolver 682 has an associated cache containing information about recent lookups. If this cache can provide an answer to the request, the resolver 682 will return the value in the cache to the application 683 that made the request. If the cache does not contain an answer, the resolver 682 will send the request to one or more designated DNS servers.

In the method 702, the cache does not contain an answer and at a receipt block 708, the request is received by the user's ISP server 690. The ISP server 690 has a local resolver 692 and typically an associated cache. If the associated cache does not provide an answer for the requested domain name, then the ISP server 690 transmits the request to the DNS server 695. Per a receipt block 712, the DNS server 695 receives the domain name.

The DNS server 695, per a search block 716, performs a recursive search using instructions provided by a search module 697 (e.g., a standard DNS search). The search generally starts at a particular network node (e.g., at a nameserver in a local ISP) and progresses recursively until matching servers are found for the domain name. This matching process can contact all of the matching servers, per a contact block 720, where an opportunity exists for communication of ILC information. In the system 701, the server 685 includes ILC instructions 689 that can ascertain an ILC for the server 685. Upon contact with the DNS server 695, the ILC of the server 685 may be communicated according to a standard DNS protocol. In the example of FIG. 7, the server 685' is also associated with the domain name and contacted by the DNS server 695. The server 685' also provides an ILC to the DNS server 695.

According to the method 702, after the servers 685, 685' have been contacted, per a return block 724, address information and corresponding ILCs flow to the ISP server 690. Per another return block 728, the ISP server 690 provides this information to the client 680 where the client 680 can determine whether the server 685 or the server 685' is the optimal server.

As mentioned, the method 702 may use a DNS protocol (e.g., UDP, TCP, etc.). DNS primarily uses UDP on port 53 to serve requests. Almost all DNS queries consist of a single UDP request from a client followed by a single UDP reply from a server. TCP normally comes into play when response data size exceeds 512 bytes, or for such tasks as zone transfer. Some operating systems such as HP-UX are known to have resolver implementations that use TCP for all queries, even when UDP would suffice.

"Extensions to DNS" (EDNS) is an extension of the DNS protocol that can enhance transport of DNS data in UDP packets, and that adds support for expanding the space of request and response codes (see, e.g., RFC 2671).

Figure 8:
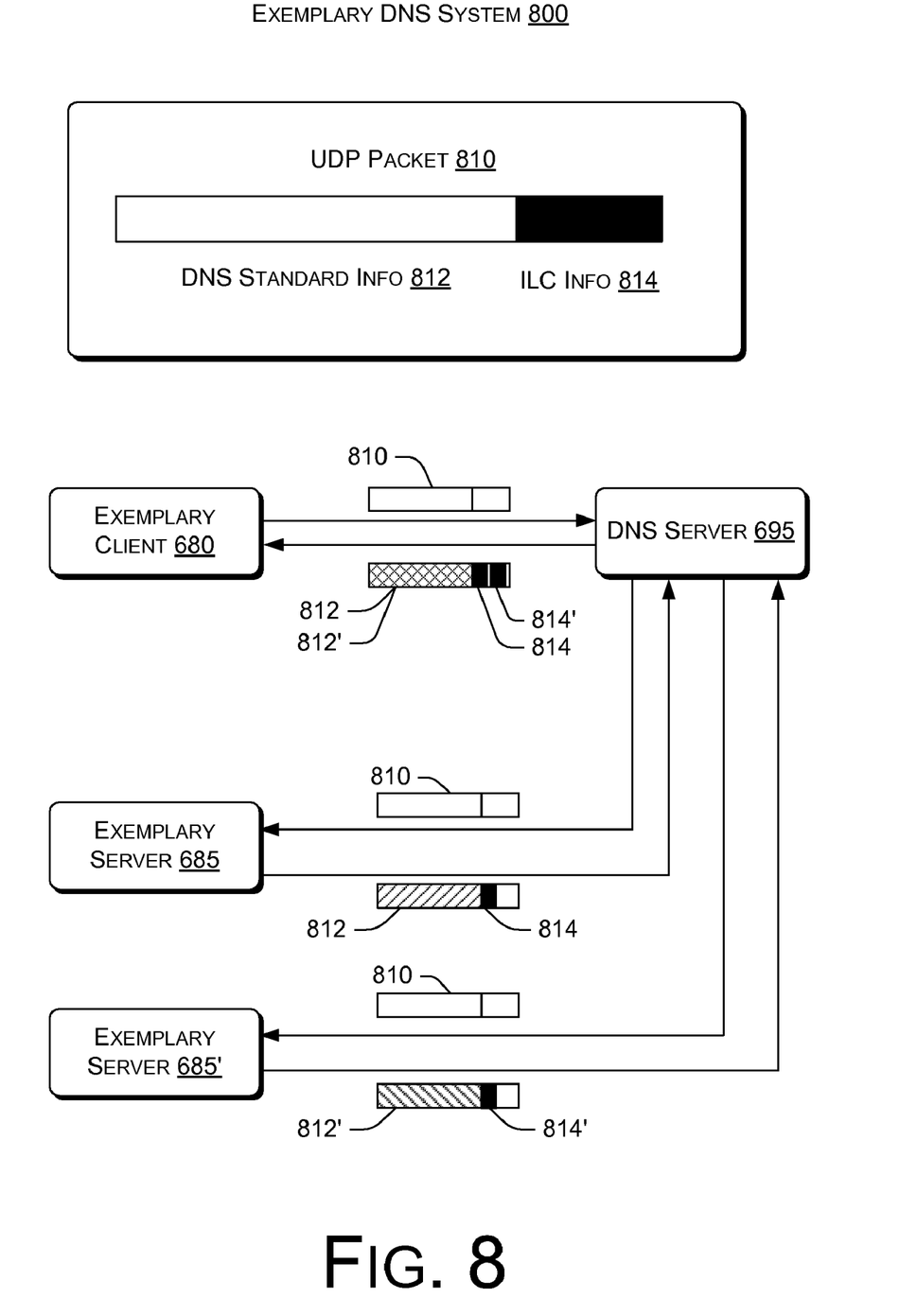
FIG. 8 is a diagram of an exemplary DNS system that uses UDP packets for logical space information.

As described herein, ILC information may be transported in a packet such as a UDP packet or a TCP packet. FIG. 8 shows an exemplary DNS system 800 where a UDP packet 810 includes a portion for standard DNS information 812 and a portion for ILC information 814. As shown, a client 680 transmits a request to a DNS server 695 using a UDP packet 810. The DNS server 695 has previously been contacted by a first server 685 and a second server 685' where the servers 685, 685' provide standard information 812, 812' and respective ILC information 814, 814'. The DN server 695 then communicates the UDP packet to the client 680 with the standard information 812, 812' and the ILC information 814, 814'.

In the example of FIG. 8, the ILC information 814, 814' is structured to allow the client 680 to associate it with the proper server. For example, the order of information in the standard portion 812 of the UDP packet may dictate the order of the ILC information in the ILC information portion 814 of the UDP packet.

Figure 9:
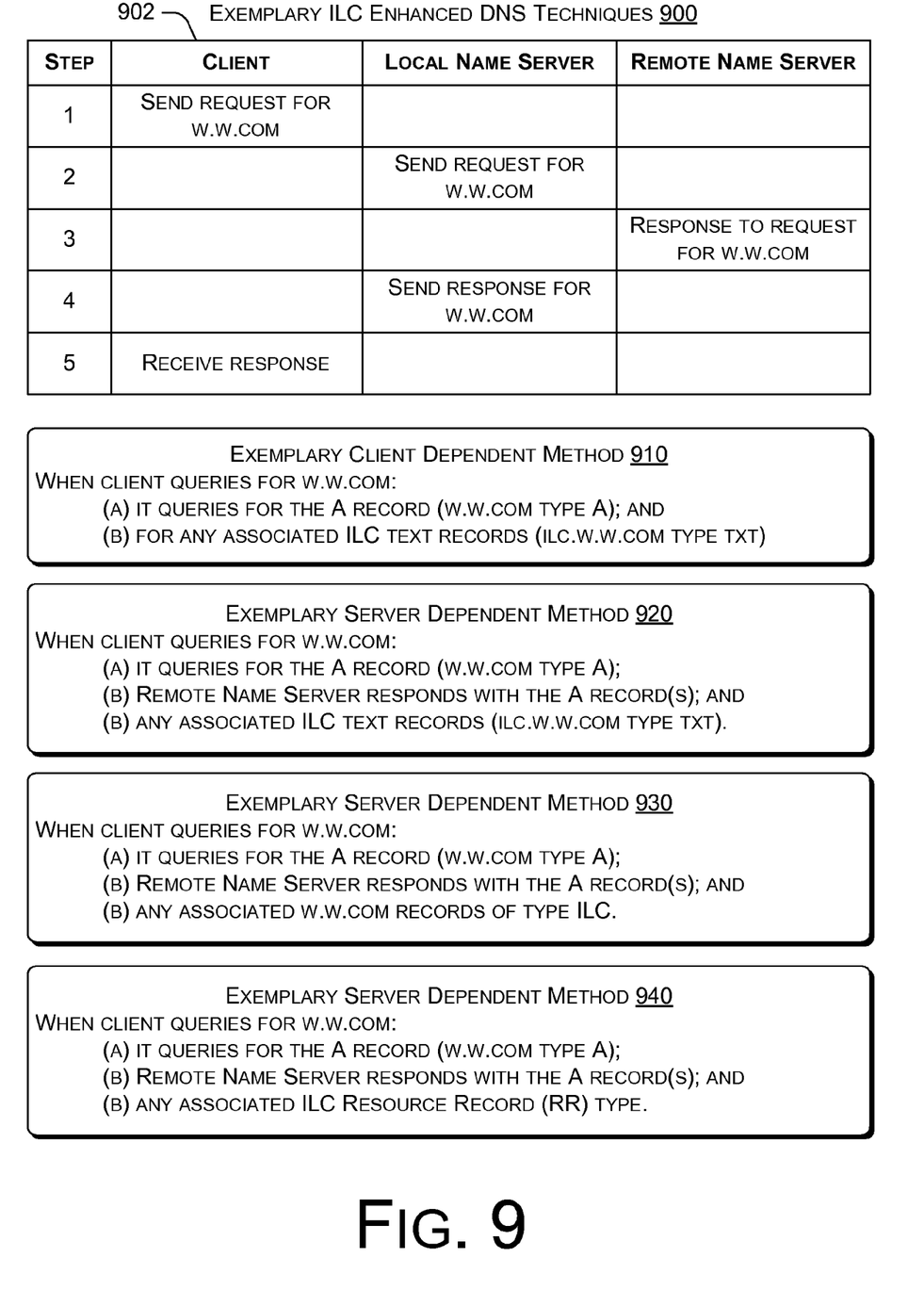
FIG. 9 is a diagram of an exemplary DNS techniques for communicating ILC information.

FIG. 9 shows various exemplary ILC enhanced DNS techniques 900 for communicating ILC information. A table 902 includes various steps (1-5) where a client requests information for a name "w.w.com" (step 1) and ultimately receives a response (step 5). In the example of the table 902, a local name server receives the request from the client (step 2), relays the request to a remote name server (step 3) and then relays the response from the remote name server to the client (step 4).

As described herein, a method for communicating ILC information may be "client dependent" or "server dependent". A client dependent method 910 commences when a client issues a query for the domain name "w.w.com". Specifically, the client queries for the A record (w.w.com type A) and for any associated ILC text records (e.g., ilc.w.w.com type txt). The method 910 provides significant backward compatibility; however, it doubles the number of DNS queries. As these queries are done at about the same time, they will have a minimal impact on performance. Of course, the impact will increase as the number of clients performing queries increases, depending on timing and frequency of queries.

In a server dependent method 920, when a client issues a query for the A record (w.w.com type A), a remote name server responds with the A record(s) and any associated ILC text records (e.g., ilc.w.w.com type txt). In the method 920, only a single query is required. Further, procedures may be implemented to ensure that any additional TXT record is appropriately handled and not ignored.

In another server dependent method 930, when a client issues a query for the A record (w.w.com type A), a remote name server responds with the A record(s) and any associated w.w.com records of a specialized type ILC. The method 930 requires only a single query and servers are unlikely to ignore the ILC record since it is associated with the same label. In this example, the ILC record type requires implementation in the DNS system.

In yet another server dependent method 940, when a client issues a query for the A record (w.w.com type A), a remote name server responds with the A record(s) and any associated ILC Resource Record (RR) type. In the method 940, the additional ILC records can contain an indicator of the record they are associated with in addition to the ILC information.

Figure 10:
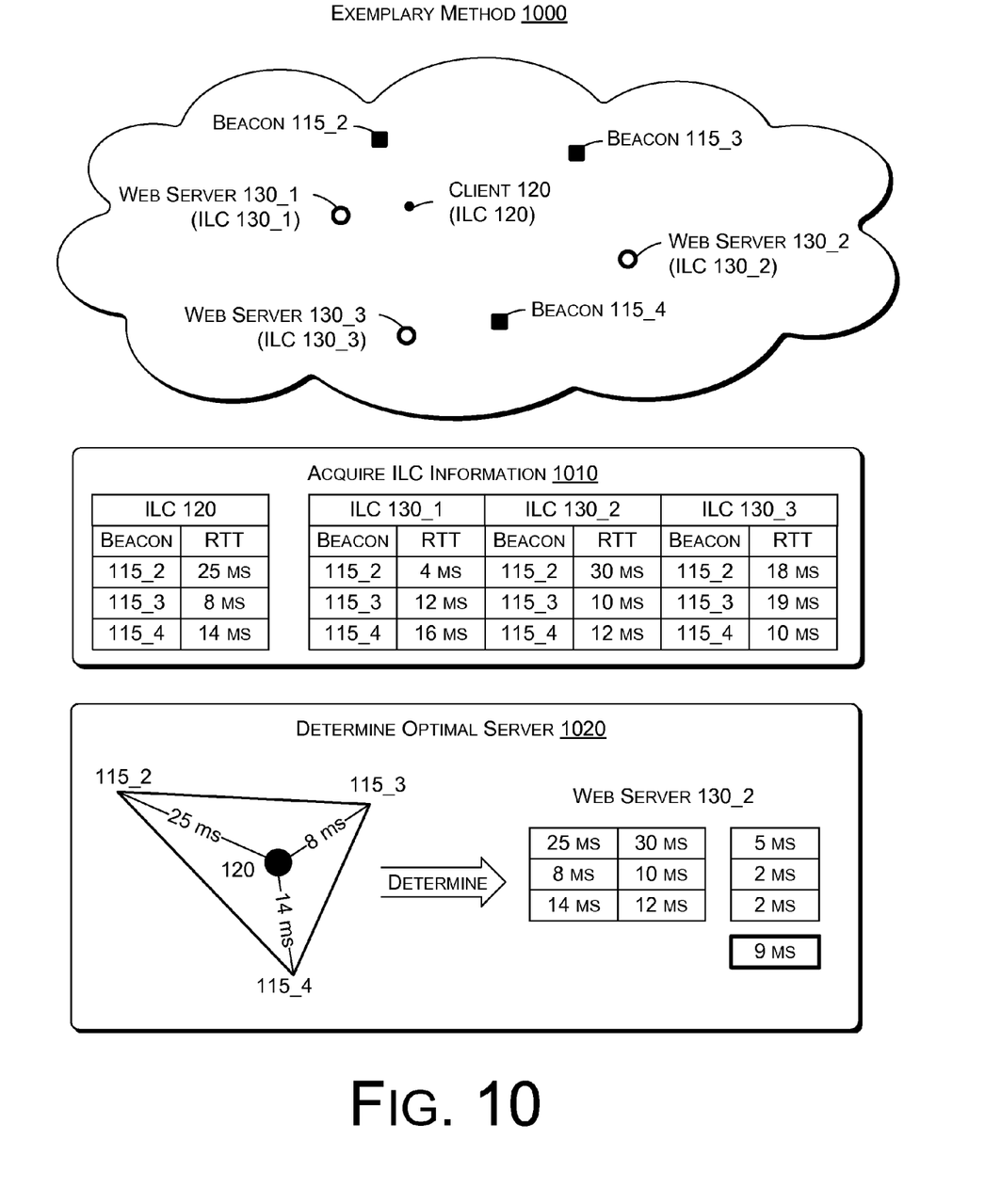
FIG. 10 is a diagram of an exemplary logical space method for determining logical space indicators or coordinates for a client.

FIG. 10 shows an exemplary method 1000. The method 1000 refers to the client 120 of FIG. 1, the web servers 130_1, 130_2 and 130_3 and the beacons 115_2, 115_3 and 115_4. An acquisition block 1010 acquires information about the client 120 and the web servers 130_1, 130_2 and 130_3 in relationship to the three beacons 115_2, 115_3 and 115_4. A determination block 1020 determines the optimal web server as the web server 130_2 based on an exemplary algorithm that takes the absolute value of the difference between a beacon RTT for the client 120 and a corresponding beacon RTT for each web server. The algorithm adds the results and selects the web server with the smallest sum. The algorithm of FIG. 10 finds the web server in the "best" part of the network space compared to the client's position in the network space. Other algorithms may be used to compare ILCs.

While the example of FIG. 10 pertains to a travel time (or transmission time) based on a single packet to a beacon, an exemplary method may send a train of packets to a beacon. Accordingly, the packet train may be analyzed to provide a more accurate indication of travel time between the client and the beacon, and to incorporate congestion information.

As described herein, an ILC can represent latencies in a network. As latencies may change over time, an ILC may be updated. For example, as peak usage nears, a participant may see its respective beacon RTTs increase; whereas, during non-peak (e.g., late night, early morning, holidays, etc.), the participant may see its respective beacon RTTs decrease.

An exemplary ILC may include information such as a time of "measurement" for a tuple received in response to a DNS request. Such information may be generated upon transmission of a packet or upon receipt of a packet. An exemplary method records a RTT for a beacon along with a "freshness" time; where a stale time may indicate a problem with a participant.

In various examples, participants may rely on the same set of beacons. In other examples, the beacons for a client and a web server or group of web servers associated with a domain name may differ. In such circumstances, additional information about the beacons may be used in selecting the best participant amongst a group of participants.

Figure 11:
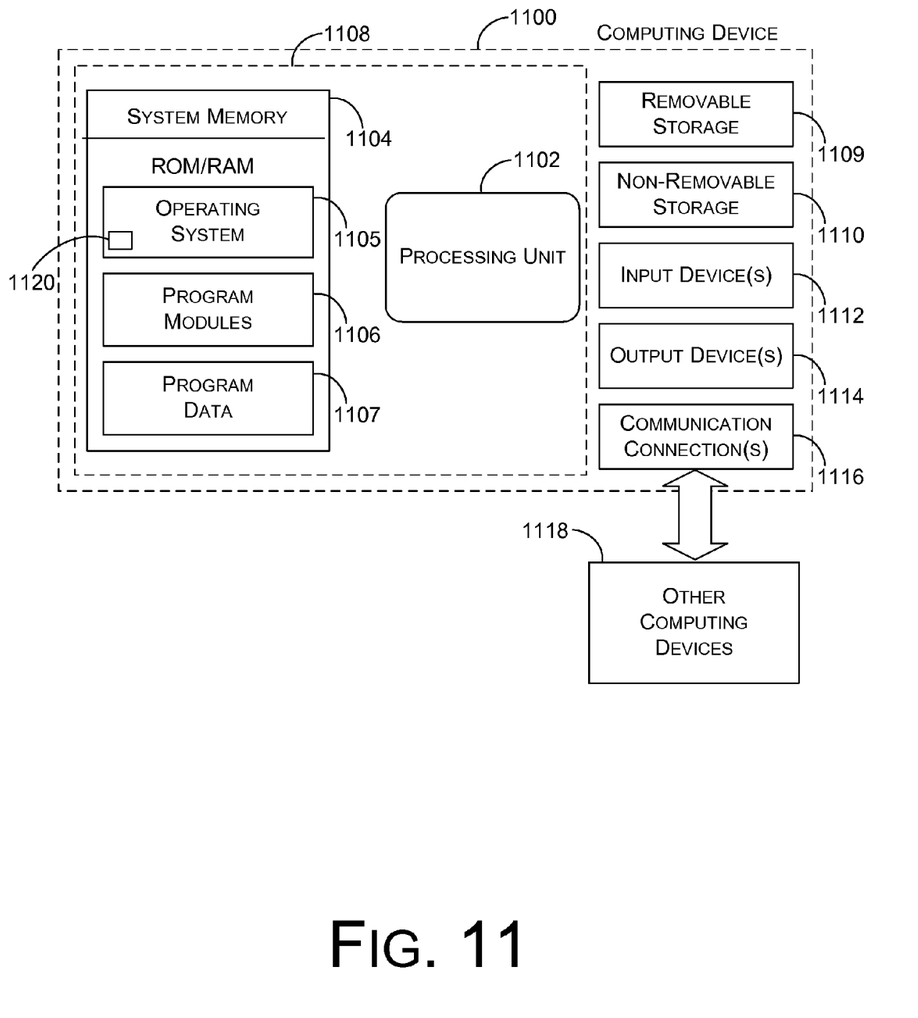
FIG. 11 is a block diagram of an exemplary computing device.

FIG. 11 illustrates an exemplary computing device 900 that may be used to implement various exemplary components and in forming an exemplary system. For example, the clients 120 or the servers 130 of the system of FIG. 1 may include various features of the device 1100.

In a very basic configuration, computing device 1100 typically includes at least one processing unit 1102 and system memory 1104. Depending on the exact configuration and type of computing device, system memory 1104 may be volatile (such as RAM), non-volatile (such as ROM, flash memory, etc.) or some combination of the two. System memory 1104 typically includes an operating system 1105, one or more program modules 1106, and may include program data 1107. The operating system 1105 include a component-based framework 1120 that supports components (including properties and events), objects, inheritance, polymorphism, reflection, and provides an object-oriented component-based application programming interface (API), such as that of the .NET™ Framework marketed by Microsoft Corporation, Redmond, Wash. The device 1100 is of a very basic configuration demarcated by a dashed line 1108. Again, a terminal may have fewer components but will interact with a computing device that may have such a basic configuration.

Computing device 1100 may have additional features or functionality. For example, computing device 1100 may also include additional data storage devices (removable and/or non-removable) such as, for example, magnetic disks, optical disks, or tape. Such additional storage is illustrated in FIG. 11 by removable storage 1109 and non-removable storage 1110. Computer storage media may include volatile and nonvolatile, removable and non-removable media implemented in any method or technology for storage of information, such as computer readable instructions, data structures, program modules, or other data. System memory 1104, removable storage 1109 and non-removable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 1100. Computing device 900 may also have input device(s) 1112 such as keyboard, mouse, pen, voice input device, touch input device, etc. Output device(s) 1114 such as a display, speakers, printer, etc. may also be included. These devices are well know in the art and need not be discussed at length here.

Computing device 1100 may also contain communication connections 1116 that allow the device to communicate with other computing devices 1118, such as over a network. Communication connections 916 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network architecture comprising:
 a network;
 name servers associated with a Domain Name System (DNS);
 beacons in communication with the network and positioned at a plurality of locations throughout the network;
 clients in communication with the network wherein each of the clients comprises instructions to determine an Internet Location Coordinate (ILC) based in part on sending packets to, and receiving corresponding response packets from, a plurality of the beacons; and
 web servers in communication with the network wherein each of the web servers comprises instructions to determine an Internet Location Coordinate (ILC) based in part on sending packets to, and receiving corresponding response packets from, a plurality of the beacons and instructions to send an Internet Location Coordinate (ILC) to one of the name servers of the Domain Name System (DNS), wherein:
  in response to a request from a client for a domain name, a plurality of the web servers associated with the domain name communicate, directly or indirectly, their respective ILC to the client; and
  the client calculates differences between the ILC of the client and each ILC of the plurality of the web servers.

2. The network architecture of claim 1 wherein the client selects one of the plurality of servers based in part on the differences.

3. The network architecture of claim 1 wherein the network comprises the Internet.

4. The network architecture of claim 1 wherein the Internet Location Coordinate (ILC) comprises a plurality of tuples.

5. The network architecture of claim 4 wherein a tuple comprises a beacon identifier and a round trip time (RTT).

6. A method, implemented in part by at least one computing device, the method comprising:
 determining, by a client, an associated client Internet Location Coordinate (ILC) based in part on sending data to a plurality of network beacons;
 determining, by web servers, an associated web server Internet Location Coordinate (ILC) based in part on sending data to a plurality of network beacons;
 requesting, by the client, information for a plurality of web servers associated with a network domain name wherein the information comprises each web server ILC associated with each of the plurality of web servers;
 receiving, by the client, the information, directly or indirectly, from a name server associated with a Domain Name System (DNS);
 calculating, by the client, differences between the associated client ILC and each web server ILC associated with each of the plurality of web servers; and
 based in part on the information, selecting an optimal web server for the network domain name.

7. The method of claim 6 wherein each of the plurality of servers transmits packets to at least two network beacons to ascertain a transmission time between the server and each of the network beacons.

8. The method of claim 6 wherein each of the network beacons reflects a packet received from a server to allow the server to determine a round trip time (RTT) for the network beacon.

9. The method of claim 6 wherein the information comprises a network latency indicator for each of the plurality of servers.

10. The method of claim 6 wherein the client performs the selecting.

11. The method of claim 6 wherein the client performs the selecting based at least in part on the calculating.

12. The method of claim 6 wherein the receiving comprises receiving a User Datagram Protocol (UDP) packet from a DNS server, the server ILC information associated with each of the plurality of servers being encapsulated in the UDP packet.

13. The method of claim 6 wherein the requesting comprises a request issued by a Domain Name System (DNS) resolver.

14. The method of claim 6 wherein the selecting comprises selecting an optimal server for the network domain name based in part on transmission times from the client to a plurality of network beacons.

15. A method, implemented in part by at least one computing device, the method comprising:
 transmitting packets to a plurality of network beacons;
 based in part on the transmitting, determining a transmission time for each of the plurality of network beacons;
 calculating, by a web server, a web server Internet Location Coordinate (ILC) based in part on transmission times between the web server and each of the plurality of network beacons;
 calculating, by a client, a client Internet Location Coordinate (ILC) based in part on transmission times between the client and each of the plurality of network beacons;
 communicating, by the web server, the web server ILC to a domain name server;
 communicating, directly or indirectly by the domain name server, the web server ILC to the client;
 calculating, by the client, differences between the client ILC and the web server ILC; and
 ascertaining, by the client, based at least in part on the differences, whether to select the web server for servicing one or more requests by the client.

16. The method of claim 15 further comprising periodically repeating the transmitting, determining and calculating.

17. The method of claim 15 wherein the Internet Location Coordinate (ILC) comprises a tuple for each of the network beacons.

18. The method of claim 17 wherein the tuple comprises a beacon identifier and a round trip time (RTT) for a packet sent to the network beacon.

* * * * *